United States Patent [19]
Burke

[11] 3,872,206
[45] Mar. 18, 1975

[54] ACETAL ADDITION TO VISCOSE OR AMGLOSE XANTHATE SOLUTIONS FOR THE MANUFACTURE OF CROSSLINKED SHAPED ARTICLES

[75] Inventor: Noel I. Burke, Danville, Ill.

[73] Assignee: Tee-Pak, Inc., Chicago, Ill.

[22] Filed: Oct. 5, 1973

[21] Appl. No.: 404,053

[52] U.S. Cl.............. 264/188, 106/165, 106/168, 106/210, 260/9, 264/190, 264/191
[51] Int. Cl............................ D01f 3/10, D01f 3/14
[58] Field of Search................... 264/188, 190, 191; 106/165, 168, 210; 260/9

[56] References Cited
UNITED STATES PATENTS
2,852,333  9/1958  Cox et al. .......................... 106/165
3,018,158  1/1962  Mitchell et al...................... 264/191

OTHER PUBLICATIONS
Chem. Abst. Vol. 70: 20947N, Gordon, "Crease-Resistant Fabric . . . Acetal . . . and Quaternary $NH_4$ salt."

*Primary Examiner*—Morris Liebman
*Assistant Examiner*—Edward Woodberry
*Attorney, Agent, or Firm*—Russell L. Brewer; Neal J. Mosely

[57] ABSTRACT

This invention relates to an improvement in a method for manufacturing shaped articles of cellulose or amylose wherein an alkaline slurry of the xanthates of the same are extruded to form a shaped article, passed into an acid bath for regenerating the cellulose or amylose, and reacted with an aldehyde. The improvement comprises adding to the viscose and prior to extrusion, a water soluble acetal represented by the formulas:

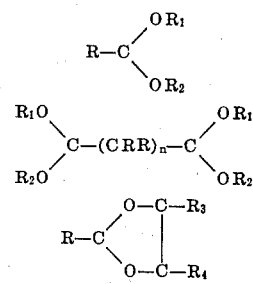

wherein R represents a hydrogen atom, an alkyl group having from 1 – 6 carbon atoms, an alkylene group having from 1 – 6 carbon atoms, or a cycloaliphatic group, $R_1$ and $R_2$ represent an alkyl group having from 1 – 6 carbon atoms in the structure or a cycloaliphatic group and can be like or unlike, $R_3$ and $R_4$ represent hydrogen or alkyl groups having from 1 – 3 carbon atoms and ($n$) is a number from 0 – 4.

7 Claims, No Drawings

ACETAL ADDITION TO VISCOSE OR AMGLOSE XANTHATE SOLUTIONS FOR THE MANUFACTURE OF CROSSLINKED SHAPED ARTICLES

DESCRIPTION OF THE PRIOR ART

In the manufacture of shaped articles from cellulosic materials such as cellophane, rayon, regenerated cellulose products, or amylose, it is customary to convert the cellulose or amylose to a spinnable solution, extrude the solution to form the shaped article, and then regenerate the cellulose or amylose. Sometimes, a crosslinking agent such as an aldehyde is used to crosslink the cellulose or amylose to provide additional desired properties.

One of the preferred methods of forming shaped articles from cellulose is the viscose process. In this process a cellulosic source such as wood and/or cotton linters is first steeped in sodium hydroxide and then shredded to form a sodium or alkali cellulose crumb. The alkali crumb is reacted with carbon disulfide to form sodium cellulose xanthate and then is dissolved in dilute alkali metal hydroxide solution. Viscose is a solution of sodium cellulose xanthate in caustic soda and contains from about 5–10% alkali metal hydroxide and about the same proportion of cellulose xanthate. It is allowed to age until it has matured and is extruded and passed into an acid regenerating bath. Typically the regenerating bath is in combination with a coagulating bath and comprises sulfuric acid and sodium sulfate. This mixture effects decomposition of the xanthate and coagulation of the extruded product. After regeneration, the shaped articles are washed with water and dried.

Often in the manufacture of certain types of cellulose or amylose products, it is desirable to react, or crosslink, or both, the cellulose or amylose with a crosslinking agent, e.g., aldehydes, in order to alter the physical properties. This is particularly true with respect to the making of textiles and textile related products. Formaldehyde has been used as a crosslinking agent for cellulose and amylose in order to provide dimensional stability, wrinkle recovery, and improved strength. Glyoxal, gluteraldehyde, and alpha hydroxy adipaldehyde are other representatives of aldehydes used as crosslinking agents for cellulose.

Aldehydes for crosslinking cellulose generally have been previously incorporated therein in one of three ways (1) by addition to the viscose, (2) by addition to the spinning bath prior to extrusion, and (3) by addition to the acid regenerating bath. These methods for incorporating the aldehydes, however, are not without drawbacks. If the aldehyde is added to the spinning bath in a proportion of over about 5% by weight of bath, there often is a substantial loss of aldehyde overhead which can cause discomfort to plant operators. Also, the free aldehyde is unstable in a spinning bath and can react with xanthate as well as the decomposition products to form cellulose xanthate methylol esters.

If the aldehyde and particularly formaldehyde were added to viscose it tended to retard regeneration of the cellulose. Additionally, the aldehyde formed Cannizzaro reaction products in such medium.

As mentioned, aldehydes have also been added to the acid regenerating bath in order to crosslink the cellulose in the regeneration bath. The basic problem centered about the fact that diffusion of the crosslinking agent into the shaped article often was limited to surface diffusion and often resulted in non-uniform crosslinking of the cellulose.

SUMMARY OF THE INVENTION

This invention relates to an improvement in a method for forming shaped articles from regenerated cellulose, e.g., rayon and cellophane and amylose. The basic method of forming the shaped articles comprises: forming an alkaline solution of cellulose or amylose xanthate containing a crosslinking agent, extruding the solution to form a shaped article, passing the shaped article into an acid-containing bath for regenerating the cellulose or amylose and crosslinking the cellulose or amylose with an aldehyde. The improvement constituting the basis of this invention comprises: adding to the alkaline solution and prior to extrusion a masked aldehyde, i.e., a water soluble acetal represented by the formulas:

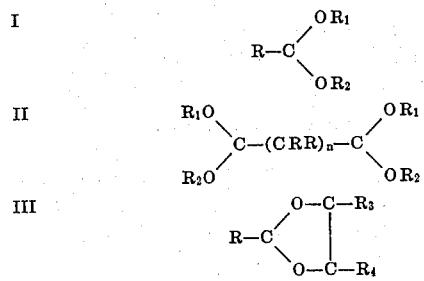

wherein R represents a hydrogen atom, an alkyl group having from 1–6 carbon atoms, an alkylene group having from 1–6 carbon atoms, or a cycloaliphatic group, $R_1$ and $R_2$ represent an alkyl group having from 1–6 carbon atoms in the structure or a cycloaliphatic group and can be like or unlike $R_3$ and $R_4$ represent hydrogen or alkyl groups having from 1–3 carbon atoms and ($n$) is a number from 0–4.

This invention takes advantages of the properties of acetals in that acetals are stable in an alkaline medium and in that form do not react with the cellulose or amylose but are unstable in an acid medium and are converted to an aldehyde and by-product alcohol. Because of the ability of the acetal to regenerate aldehyde in the acid regeneration bath, the cellulose or amylose can be crosslinked in situ to produce a desired product.

Advantages of this method include: the ability to eliminate losses of aldehyde overhead in the processing operation; the ability to eliminate substantial discomfort and possible health hazards for plant operators due to evaporation of aldehyde; the ability to effect intimate association of the masked aldehyde, i.e., the acetal, with the cellulose or amylose prior to extrusion in order to obtain a more uniformly crosslinked or reacted product; the ability to eliminate the formation of substantial amounts of insoluble products such as trithiane and xanthate decomposition products, e.g., cellulose xanthate methylol esters; and the ability to maintain aldehyde concentration in the regeneration bath to extremely low levels which are not harmful to operators.

Acetals are widely known in the art and can be synthesized by reacting an aldehyde with an alcohol. Water soluble acetals (at least 1 g acetal will dissolve in 100 g of water) which are contemplated by this invention for forming a wide variety of cellulosic products, including crosslinked cellulosic products, are represented by the following formulas:

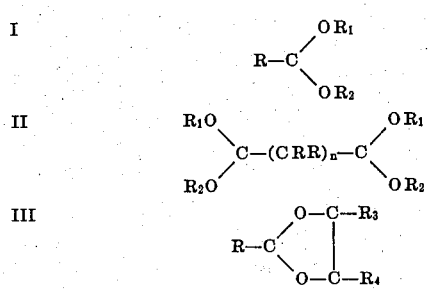

wherein R represents a hydrogen atom, an alkyl group having from 1–6 carbon atoms, an alkylene group having from 1–6 carbon atoms, or a cycloaliphatic group, $R_1$ and $R_2$ represent an alkyl group having from 1–6 carbon atoms in the structure or a cycloaliphatic group and can be like or unlike $R_3$ and $R_4$ represent hydrogen or alkyl groups having from 1–3 carbon atoms and $(n)$ is a number from 0–4.

The water soluble acetals (at least 1 g soluble per 100 g water) represents by the above formulas can be prepared from the reaction of monohydroxy alcohols having from 1–7 carbon atoms and monoaldehydes having 1–7 carbon atoms as in Formula I or dialdehydic compounds having from 1–7 carbon atoms as in Formula II and dialkanols having from 1–7 carbon atoms with a monoaldehyde having from 1–7 carbon atoms in the structure as in Formula III. In most applications particularly in the textile field, simple aldehydes, i.e., lower alkyl aldehydes having from 1–7 carbon atoms, and lower alkanols having from 1–7 carbons atoms are used in preparing the acetal.

Examples of alcohols which can be used for preparing the acetals include methanol, propanol, butanol, pentanol, hexanol, isopropanol, isobutanol, allyl alcohol, and dihydroxy compounds such as ethylene glycol, propylene glycol, butane diol, pentane diol, and hexane diol. These alcohols can also be substituted with groups as desired which include nitro ($NO_2$), halogen such as chlorine, phosphate, alkoxy, amines, carboxylic acid, ether, and so forth.

Examples of aldehydes which can be used in forming the acetals include the lower alkyl monofunctional aldehydes such as formaldehyde acetaldehyde, propionaldehyde, buteraldehyde, pentaldehyde, and hexaldehyde, acrolein, crotonaldehyde and methacrolein. Difunctional aldehdyes such as glyoxal, glutaraldehyde, adipaldehyde, malonic dialdehyde, succinic dialdehyde, and fumaric aldehyde, maleic aldehyde, and the like. Like the alcohols they can also be substituted with the nitro ($NO_2$), halogen such as chlorine, phosphate, alkoxy, amines, carboxylic acid, ether groups as desired.

Broad proportions of the acetal, based on aldehyde to be produced, can be added as desired to the alkaline medium of cellulose or amylose. Of course, the proportion of aldehyde for crosslinking varies with the types of physical properties desired in cellulose and amylose and the types of aldehydes used as the crosslinking agent. Generally, the proportion of acetal added to the bath is sufficient to produce from about 0.5% to about 25% and typically is from about 1–10% aldehyde by weight of the cellulose or amylose.

The following examples are provided to illustrate preferred embodiments of this invention and are not intended to restrict the scope thereof. All percentages are expressed as weight percentages.

EXAMPLE 1

A commercial viscose is prepared by steeping chemically pure cellulose, e.g., wood and cotton linters, (a 50:50 ratio) in 19% caustic soda, shredding the steeped cellulose to form alkali crumb, xanthating the crumb by reacting the alkali crumb with carbon disulfide, and then dissolving the resultant alkali cellulose xanthate in dilute caustic soda. The viscose has a cellulose content of about 7.7%, a caustic soda content of about 6%, and the balance water.

A 5% portion by weight of the viscose of an acetal formed by reacting glutaraldehyde with ethanol, based on the cellulose, is added to the viscose and substantially homogeneously dispersed therein. The viscose is allowed to age or ripen until ready for extrusion and when ready is passed through an extrusion die in the shape of a slit to form a film.

The extruded viscose then is substantially immediately passed into a combination regenerating and coagulating bath of conventional composition. The bath in this case contains about 149 g/liter of sulfuric acid and about 248 g/liter of sodium sulfate. The pH of this bath is from about 0–1. On extrusion of the film into the coagulating and regenerating bath the xanthate group and the acetal, which is dispersed in the film, are decomposed by the acid thus regenerating the cellulose and effecting crosslinking of the cellulose with the regenerated glutaraldehyde. The acetal linkage generated by the reaction of glutaraldehyde and cellulose is substantially irreversible compared to that generated by the reaction of the glutaraldehyde and ethanol even in an acid medium. For this reason, substantially all of the glutaraldehyde is reacted with the cellulose to form a crosslinked product having desired properties.

EXAMPLE 2

Example 1 is repeated except that alkali amylose xanthate is prepared and used in place of the alkali cellulose xanthate. Alkali amylose xanthate is prepared by steeping amylose with alkali metal hydroxide, e.g., sodium hydroxide, xanthating with carbon disulfide to form sodium amylose xanthate and then dissolving the sodium amylose xanthate in caustic soda. The proportion of sodium amylose xanthate is about 7% and the alkali content is about 6% by weight.

The acetal of Example 1, namely, the glutaraldehyde diethyl acetal, is mixed in the alkali amylose xanthate in a proportion of 5% by weight and is added to the sodium amylose xanthate and then subsequently extruded to form a shaped article, namely, a film. On regeneration of the amylose xanthate and the acetal to the aldehyde, crosslinking of the amylose occurs to form a desired product.

EXAMPLE 3

Example 1 is repeated except that the acetal is formaldehyde dimethanol acetal and is used in a proportion of 10% by weight based on the cellulose. On regeneration of the alkali cellulose xanthate and aldehyde in the regeneration bath crosslinking in situ of the regenerated cellulose occurs to form a desired product. The crosslinking of the cellulose appears to be uniform throughout the product, however, the product tends to be brittle.

EXAMPLE 4

Example 1 is repeated except that the regenerating and coagulating bath contains from about 25 g/l sulfuric acid and about 100 g/l sodium sulfate. The pH of the bath is from about 1–2. Crosslinking of the cellulose appears uniform throughout the cellulose to produce a desired product.

EXAMPLE 5

Example 1 is repeated except that the extrusion die is an annular shape designed to form a tubular sausage casings as opposed to a sheet. Further, the acetal employed is the reaction product of hexaldehyde and isopropanol. The cellulose is regenerated when extruded from the annular die into the acid regenerating and coagulating bath and the aldehyde regenerated by the conversion of the acetal to form a cross-linked cellulose product having desirable properties.

EXAMPLE 6

When the process of Example 1 is repeated by adding an acetal comprising the reaction product of chloropropanol and formaldehyde, it is possible to effect a dual crosslinking of the cellulose in the regeneration bath. The chlorine atom can react with the xanthate to permit forming a xanthide linkage and the aldehydes generated can crosslink with the cellulose in a conventional manner.

What is claimed is:

1. In a method for the manufacture of a shaped article from a polymer selected from the group consisting of cellulose and amylose wherein said polymer is extruded as an alkaline solution as the xanthate through a die to form said shaped article, the shaped article passed into an acid bath for regenerating said polymer, and reacted with an aldehyde, the improvement which comprises adding to the alkaline solution and prior to extrusion a water-soluble acetal selected from the group consisting of the reaction product of a monohydroxy alcohol having from 1–7 carbon atoms and a monoaldehyde having from 1–7 carbon atoms, a monohydroxy alcohol having from 1–7 carbon atoms and dialdehyde compound having from 1–7 carbon atoms, and a monoaldehyde having from 1–7 carbon atoms and a dialkanol having from 1–7 carbon atoms.

2. The method of claim 1 wherein said shaped article is made of regenerated cellulose.

3. The method of claim 2 wherein said acetal is selected from the reaction product of a monoaldehyde and a monoalkanol or a monoalkanol and a dialdehyde.

4. The method of claim 3 wherein said acetal is added to the alkaline solution in a proportion to provide from about 1–10% aldehyde by weight of the cellulose.

5. The method of claim 4 wherein said acid bath has a pH below about 5 and contains a salt for effecting coagulation of the extruded cellulose.

6. The method of claim 4 wherein said acetal is glutaraldehyde diethyl acetal.

7. The method of claim 4 wherein said acetal is formaldehyde dimethanol acetal.

* * * * *